Jan. 5, 1937.  G. HEYMER  2,066,727
PHOTOGRAPHIC PRINTING
Filed April 25, 1933  2 Sheets-Sheet 1
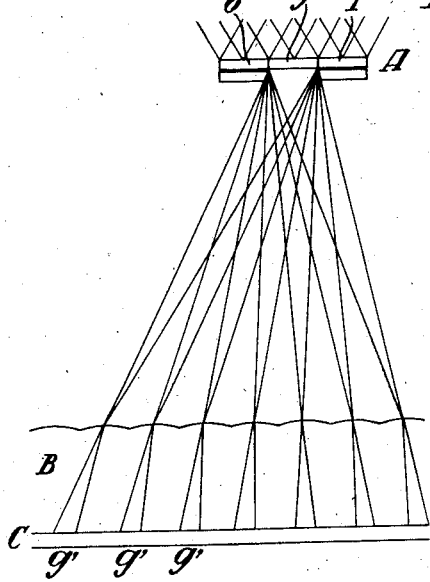
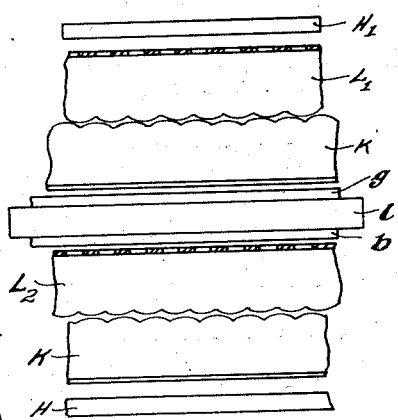
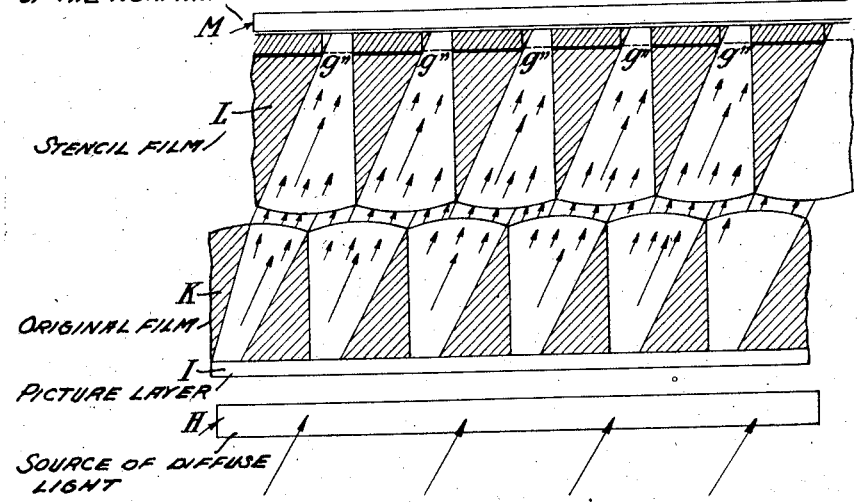
Inventor:
Gerd Heymer,
By Attorney
Philip S. Hopkins.

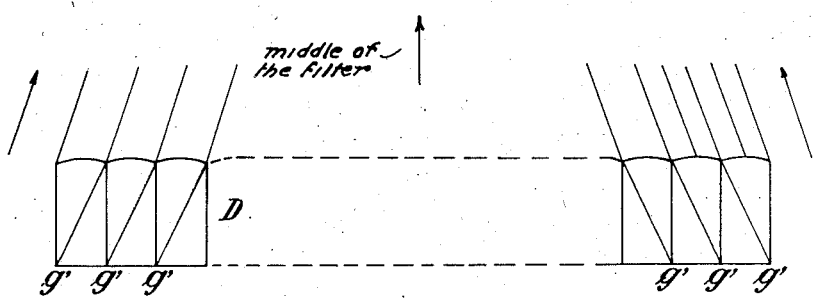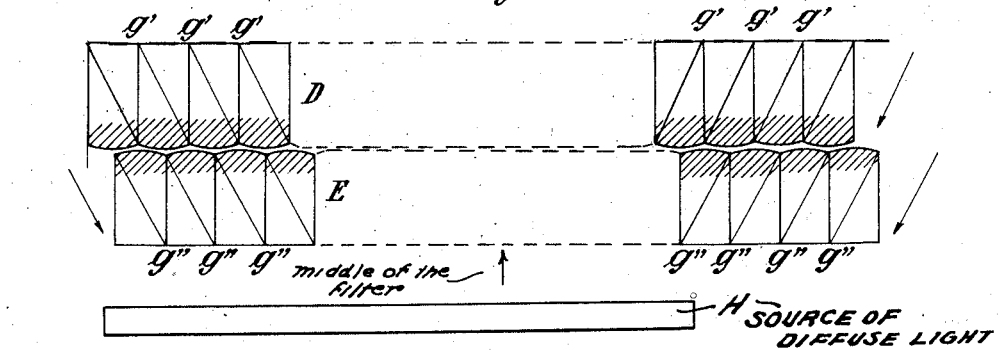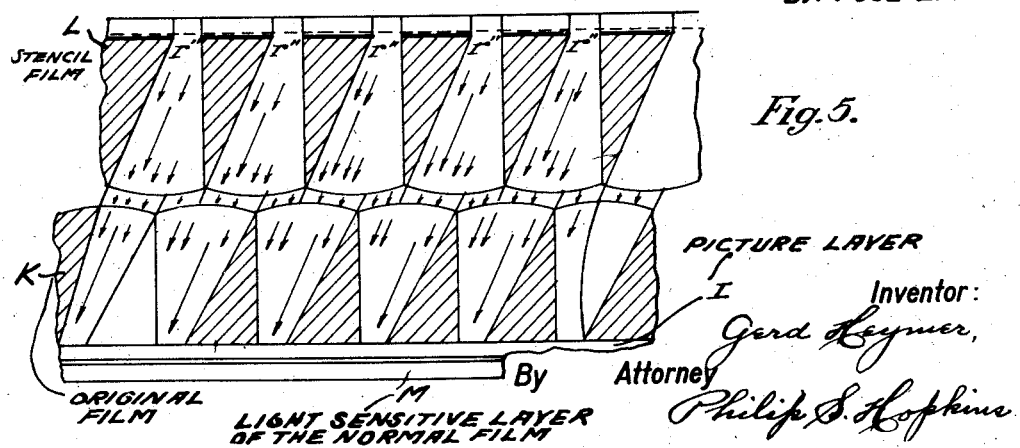

Patented Jan. 5, 1937

2,066,727

UNITED STATES PATENT OFFICE 2,066,727

PHOTOGRAPHIC PRINTING

Gerd Heymer, Dessau-in-Anhalt, Germany, assignor to Agfa Ansco Corporation, Binghamton, N. Y., a corporation of New York Application April 25, 1933, Serial No. 667,925
In Germany April 30, 1932

8 Claims. (Cl. 95—75)

My present invention relates to photographic printing and more particularly to the printing of lenticular films onto smooth film.

One of its objects is to provide a process of printing part color pictures from lenticular film onto smooth film in contact. Another object is to print in a manner whereby the lenticular elements of the lenticular film to be printed face the emulsion layer of the smooth film. Further objects will be seen from the detailed specification following hereafter. Reference is made to the accompanying drawings in which Fig. 1 illustrates an intermediate step of my new process, Fig. 2 shows the distribution of light on the margins of the lenticular film when the illumination is through a multi-color filter, Fig. 3 shows the distribution of light on the margins of a lenticular film placed in contact with the film shown in Fig. 2, Fig. 4 shows the printing step proper when printing the green sensation.

Fig. 5 shows the printing step proper when printing one of the color part pictures onto the normal film, and Fig. 6 shows the arrangement of the films for printing onto a film sensitized on both sides.

I have found that it is possible to print lenticular films onto normal or smooth films in contact when there is inserted in the path of the light rays a lenticular film prepared in a manner as hereinafter described and referred to as a "stencil film".

The following explanations disclose the essence of the invention. When a lenticular film is illuminated by means of a uniformly illuminated white plane equal in size to one area of a multi-color filter as usual for taking lenticular films and arranged at a substantial distance from the lenticulated side of the film, there will be obtained after reversal development a film which shows in its emulsion layer a pattern consisting of alternating blackened and transparent stripes. These stripes extend parallel to the lenticular elements and are distributed in such a manner that one transparent stripe and one blackened stripe are co-ordinate to one lenticular embossing. This is illustrated in Fig. 1.

Referring to Fig. 1, A designates a uniformly illuminated white plane, the three parts, $b$, $g$ and $r$ of which are equal in size to the areas of the three-color filter or their virtual images used when taking a lenticular film and arranged at the same distance from the film as is arranged the three color-filter or its virtual image in view taking, the succession of the filter areas being blue, green, red. The areas $b$ and $r$ of the white plane are masked so that only the light of the white plane, corresponding with the green area of the multi-color filter, strikes the film. When the lenticular film, consisting of the support B and the emulsion layer C is developed, there will be produced in the emulsion layer alternating black and transparent stripes. If the development is effected according to the reversal method the transparent stripes fill the space which would be occupied by the green sensation in taking the film through the usual multi-color filter. The film thus obtained will be referred to hereinafter as the "intermediate film". This intermediate film cannot be used as a "stencil film" in my printing process for the following reasons.

By inspecting the "intermediate film" it will be easily seen that the middle line of the stripe which is in the middle of the film lies exactly under the central line of the co-ordinate lenticular element, but by inspecting the position of the transparent stripes near the margin of the film it will be apparent that the middle line of the transparent stripes does not lie under the central line of the co-ordinate lenticular element, but is displaced towards the margin. This is shown in Fig. 2. The arrow in the middle of this figure points towards the middle of that area of the illuminating device corresponding with the green area of the multi-color filter used in taking. The illuminating device could not be represented, as it is too far off; it may be of the kind as diagrammatically represented in Fig. 1. D designates the lenticular film and $g'$ the middle lines of the transparent areas which are displaced towards the margin of the film.

When this intermediate film is printed onto another lenticular film with the lenticular elements in contact, there will also be formed on the latter film after reversal development alternating blackened and transparent stripes of which each pair of stripes is composed of one transparent stripe and one blackened stripe is co-ordinate with one lenticular element, the transparent stripes being a real image of the transparent stripes of the "intermediate film". The distribution of the transparent stripes and the blackened stripes is such that the middle line of the transparent stripe at the middle of the film lies under the central line of the lenticular element, but that of the transparent stripes at the margin of the film is displaced towards the middle of the film. These relations are shown in Fig. 3. In this figure D designates the "intermediate film" with the stripes $g'$. In contact with this "intermediate film" and facing the same with its lenticular elements there is arranged the "stencil film" E. When the films are illuminated from the side of the intermediate film by diffused light, i. e. a uniformly illuminated white plane, the middles of the transparent stripes are printed in the manner as indicated in Fig. 3, and it is seen that the middles of the transparent stripes, which in the "intermediate film" are displaced towards the margin, have been displaced towards the middle of the "stencil film". By inspection of the two films arranged in contact it will be apparent that, while all the light rays emanating from the transparent stripes of the "intermediate film" cut each other in a point opposite the lenticulated surface of this film, i. e. the middle of the green area of the multi-color filter (indicated in the figure by an arrow), the corresponding light rays of the print, the "stencil film", diverge and their backward extensions beyond the emulsion layer cut each other in a point, which occupies the same position with relation to the print or "stencil film" as the "intermediate film" with the difference that this point is situated opposite the emulsion layer of the print or "stencil film" and opposite the lenticular surface of the "intermediate film".

The function of the "stencil film" as a mask will become apparent when in Fig. 3 the "intermediate film" is exchanged for an original taken under the same conditions with relation to size and distance of the multi-color filter or its virtual image as the "intermediate film", and when a normal or smooth film is arranged in contact with the two films, so that the emulsion layer side of the smooth film is in contact with the striped layer side of the "stencil film". This arrangement is shown in Fig. 4. In this figure K is the original with the picture layer I, L is the "stencil film" with the transparent areas $g''$, M is the light sensitive emulsion layer of the normal film, and H is a source of diffuse light, for instance a uniformly illuminated white plane. By the light, emanating from H all the stripes, containing the different color sensations, are projected on the layer of the "stencil film" but only the light of that color stripe is transmitted by the transparent stripe of the "stencil film", with which this transparent stripe is conjugate. The light of the stripes corresponding with the other color sensations is absorbed by the blackened part of the "stencil film". It is seen that the "stencil film" indeed acts as a stencil. The light passing the transparent stripes of the "stencil film" strikes the emulsion layer of the normal film and produces therein a partial color picture.

In the foregoing my new process has been described with regard to the production of one color sensation and more particularly the green part color picture when the process is used for taking a picture through a three color filter having its color areas arranged in the succession blue green red. It is obvious that the process is applicable for printing as many part color records as may be registered in a lenticular film. It is only necessary to produce as many "stencil films" as there are part color records to be printed it being observed that for each "stencil film" to be used for printing a color part picture there are applied the conditions indicated above for the production of a "stencil film" to be used for printing the green part color record, and to use in taking the lenticular film a multi-color filter with the required number of filter areas.

As the trace of the rays in optical arrangements is reversible it is also possible to illuminate first the "stencil film" in printing color part pictures from lenticular film onto normal film. In this case the arrangement of films shown in Fig. 4 is changed in the following manner as shown in Fig. 5. Next to the source of diffuse light H there is arranged the "stencil film" L facing with its layer side the source of light, then follows the original K with its embossed side in contact with the "stencil film", and finally follows the normal film to be printed on having its layer side in contact with the layer side of the original. It is seen that in this case printing is effected while the embossed side of the original is turned off the emulsion side of the film to be printed on.

My new process is therefore applicable for printing color part pictures from lenticular film onto normal film in contact with the embossed side of the lenticular film facing the normal film or not. It is of particular importance when printing on a film with a light sensitive emulsion layer applied to both sides of the support. Also in this case it is possible to print in contact on each side a part color picture from the same lenticular film in such a manner that the points are not laterally inverted with respect to one another when viewed from the same side of the normal film. While one part color picture is printed on one side of the film with the layer side of the lenticular film in contact with the layer of the film to be printed on, the next part color picture is printed on the second emulsion layer of the film to be printed on with the embossed side of the lenticular film facing the layer of the film to be printed on. Such contact printing was hitherto not possible. Such printing is shown in Fig. 6 of the accompanying drawings. In this figure C is a normal film coated with the two emulsion layers $b$ and $g$. On this film there is first printed one partial color picture of the lenticular original film K by arranging the lenticular film K with its emulsion layer in contact with the emulsion layer $g$ of the normal film C, placing the lenticular stencil film $L_1$ with its lenticulated side in contact with the lenticular film K and illuminating by means of the diffuse source of light $H_1$. Then for printing the second partial color picture of the lenticular film K, the corresponding lenticular stencil film $L_2$ is arranged with its emulsion layer in contact with the light sensitive emulsion layer $b$ of the normal film C, the lenticular film K is placed with its lenticulated side in contact with the lenticular film K, and the films are illuminated through the lenticular film K by means of a diffuse source of light $H_2$. The process is furthermore well suited for the manufacture of striated screen pictures to be viewed by reflected light.

What I claim is:

1. A process of printing in contact color part pictures from lenticular film onto normal film, which comprises arranging in contact a lenticular film bearing a silver picture taken behind a multi-color filter and a "stencil film" having in its emulsion layer behind each lenticular element a blackened and a transparent strip which cause a direction of the light falling on the "stencil film" in a manner characteristic for the partial color picture to be printed with their embossed sides facing each other, placing a normal film with its light sensitive emulsion layer in contact with one of said films arranged in contact, and exposing with a source of diffuse light through the other film.

2. A process of printing in contact color part pictures from lenticular film onto normal film, which comprises arranging in contact a lenticular film bearing a silver picture taken behind a multi-color filter and a "stencil film" having in its emulsion layer behind each lenticular element a blackened and a transparent strip which cause a direction of the light falling on the "stencil film" in a manner characteristic for the partial color picture to be printed with their embossed sides facing each other, placing a normal film with its light sensitive emulsion layer in contact with said lenticular film bearing the silver picture, and exposing with a source of diffuse light through the "stencil film".

3. A process of printing in contact color part pictures from lenticular film onto normal film, which comprises arranging in contact a lenticular film bearing a silver picture taken behind a multi-color filter and a "stencil film" having in its emulsion layer behind each lenticular element a blackened and a transparent strip which cause a direction of the light falling on the "stencil film" in a manner characteristic for the partial color picture to be printed with their embossed sides facing each other, placing a normal film with its light sensitive emulsion layer in contact with said "stencil film", and exposing with a source of diffuse light through said lenticular film bearing a silver picture.

4. A process of printing in contact color part pictures from lenticular film onto normal film, which comprises arranging in contact a lenticular film bearing a silver picture taken behind a multi-color filter and a "stencil film", having in its emulsion layer behind each lenticular element a blackened and a transparent strip which cause a direction of the light falling on the "stencil film" in a manner characteristic for the partial color picture to be printed, with their embossed sides facing each other, placing a normal film comprising a support having applied to each side of said support a light sensitive emulsion layer, with one of said emulsion layers in contact with said lenticular film bearing the silver picture, illuminating with a diffuse source of light through said "stencil film", removing said film provided with two emulsion layers, arranging said film bearing the silver picture in contact with a second "stencil film" adapted for the transmission of another color sensation, placing the normal film provided with two emulsion layers with its non-exposed emulsion layer in contact with said "stencil film", and exposing through said lenticular film bearing the silver picture.

5. A process of producing a "stencil film" for use in printing color pictures from lenticular film, which comprises illuminating a light-sensitive lenticular film by means of a diffuse source of light being equal in size to one color area of a multi-color filter and arranged during the taking operation at the same distance and in the same lateral relationship to the lenticular film as was that area of the filter or its virtual image arranged in respect of the lenticular film to be printed from with the aid of the "stencil film", developing said exposed film according to the reversal method, arranging this developed film and a second light-sensitive lenticular film in contact with their embossed sides facing each other, exposing by means of a source of diffuse light through said developed film and developing said exposed second lenticular film recording to the reversal method.

6. In combination, a lenticular film bearing a silver picture and a "stencil film" having in its emulsion layer behind each lenticular element a blackened and a transparent strip which cause a direction of the light falling on the "stencil film" in a manner characteristic for the partial color picture to be printed, arranged in contact with their embossed sides facing each other, a normal film with its light sensitive emulsion layer in contact with one of said lenticular films, and a source of diffuse light arranged on that side of the films in contact opposite the normal film.

7. In combination, a lenticular film bearing a silver picture and a "stencil film" having in its emulsion layer behind each lenticular element a blackened and a transparent strip which cause a direction of the light falling on the "stencil film" in a manner characteristic for the partial color picture to be printed, arranged in contact with their embossed sides facing each other, a normal film with its light sensitive emulsion layer in contact with said "stencil film," and a source of diffuse light arranged on the side of said lenticular film bearing a silver picture.

8. In combination, a lenticular film bearing a a silver picture and a "stencil film" having in its emulsion layer behind each lenticular element a blackened and a transparent strip which cause a direction of the light falling on the "stencil film" in a manner characteristic for the partial color picture to be printed, arranged in contact with their embossed sides facing each other, a normal film with its light sensitive emulsion layer in contact with said lenticular film bearing a silver picture, and a source of light arranged on the side of the "stencil film".

GERD HEYMER.